(No Model.)

S. H. WOOD.
Circuit Closer.

No. 239,690. Patented April 5, 1881.

Witnesses.
John Edwards Jr.
P. J. Markley

Inventor.
Spencer H. Wood
By James Shepard Atty

N. PETERS, PHOTO-LITHOGRAPHER, WASHINGTON, D. C.

UNITED STATES PATENT OFFICE.

SPENCER H. WOOD, OF NEW BRITAIN, CONNECTICUT.

CIRCUIT-CLOSER.

SPECIFICATION forming part of Letters Patent No. 239,690, dated April 5, 1881.

Application filed May 28, 1880. (No model.)

*To all whom it may concern:*

Be it known that I, SPENCER H. WOOD, of New Britain, in the county of Hartford and State of Connecticut, have invented certain new and useful Improvements in Time Attachments for Opening and Closing Electric Circuits, of which the following is a specification.

My invention relates to time attachments for opening and closing electric circuits, in which a cam driven by the time movement operates a drum intermittently, through intermediate mechanism, to bring an insulated conducting-plate against spring-arms to complete the circuit; and the object of my improvements is to automatically open and close electric circuits at predetermined times for the purpose of sounding a bell in some distant place, as a tower. I attain these objects by the mechanism illustrated in the accompanying drawings, in which—

Figure 1:
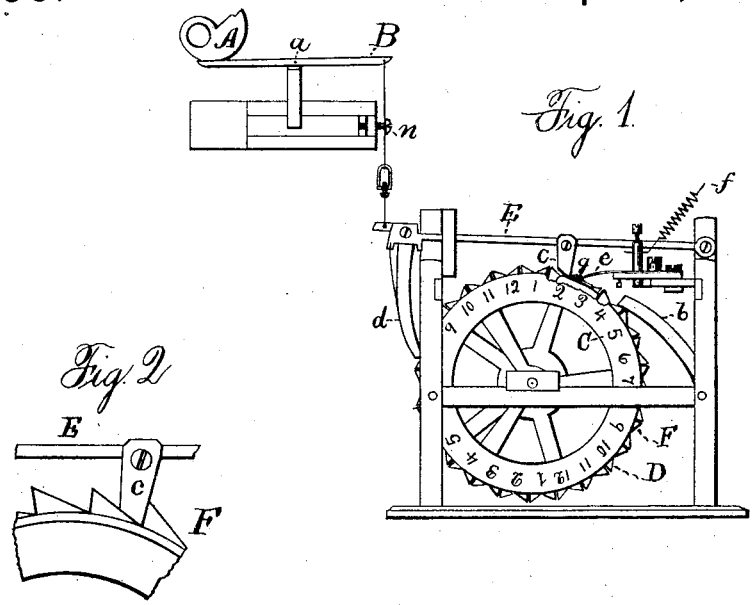
Figure 2:
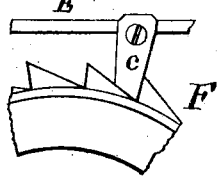
Figure 3:
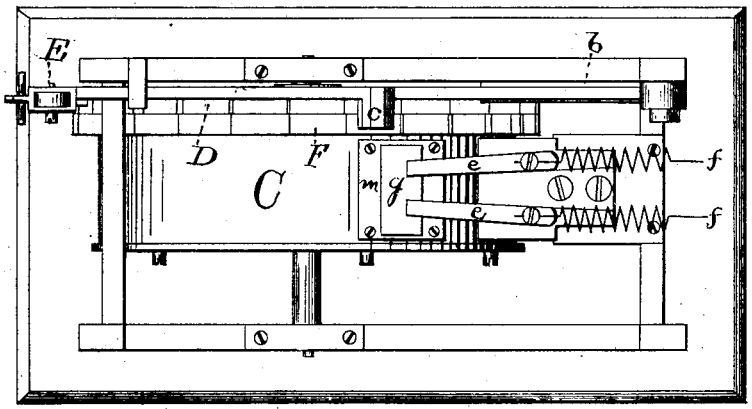

Figure 1 is a front elevation. Fig. 2 is a like view of detached parts; Fig. 3, a plan view, and Fig. 4 a front elevation, of detached parts.

A designates a cam attached to and driven by the minute-hand shaft of an ordinary clock, and consequently revolving once every hour.

B designates a lever secured to a post, $a$, in such manner that one end will be depressed by said cam at every revolution, while its opposite end is elevated. This post is adjustable laterally, by means of screw $n$, to regulate the throw or lift of the lever.

At any convenient point underneath the parts above described I place the machine proper. Any suitable frame may be employed, upon which is mounted a drum or cylinder, C, driven by a twenty-four toothed ratchet-wheel, D, one tooth or division for every revolution of the cam A, so that said drum revolves once in every twenty-four hours, but with an intermittent motion. A pawl or dog, $b$, engages the teeth of said wheel and prevents a backward movement thereof.

Over the wheel and pivoted to the frame there is a weighted lever, E, having a stop, $c$, and spring-pawl $d$, which lever is attached, by means of a suitable wire, to the outer end of lever B, and is thereby raised once every hour by the time movement and mechanism first described, and then allowed to fall. In falling the pawl engages the teeth of the ratchet-wheel D and drives it forward one division, or one twenty-fourth of a revolution.

By the side of the wheel D there is a like wheel, F, with reversed teeth, with which the stop $c$ on the lever E engages as it descends, and stops the wheels and drum at a fixed and definite point, as shown in Fig. 2, and prevents said wheels from being moved forward until the lever E and its stop $c$ have been again raised far enough to clear the teeth of the wheel F.

Upon the frame there are two spring-arms or points, $e$ $e$, to which the conducting-wires $f f$ are attached.

Upon the drum C there is an insulated conducting-plate, $g$, which projects so far from the drum as to come in contact with the spring-points $e$ $e$, as it passes under the same, once in every revolution of said drum, thereby connecting the two points and attached wires so as to form the circuit for the purpose of sounding a bell in some tower, or for any other desired purpose. In the present instance the plate $g$ is insulated by being mounted upon a rubber pad, $m$. Two or more insulated plates may be placed upon the drum, if desired, for sounding a bell at any desired hours out of twenty-four—as, for instance, twelve at noon and nine at evening. The drum C can be set in any desired position by lifting the dog $b$ and lever E, when it is free to be moved in either direction by hand. It may also be marked to indicate the hours of the day and night, to assist in setting it on correct time, using the ends of the spring-arms or any other fixed point as an index. In case it is desirable to sound the bell at a different hour than that indicated upon the drum, said drum may be set so as to be either too slow or too fast, as compared with true time, by a time equal to the desired change—as, for instance, suppose the insulated plate is so located upon the drum that when the said drum indicates correct time the bell will sound at nine p. m., and it is desired to make it sound at ten, then the drum should be moved backward one hour, so as to be one hour slower than correct time, when the bell will be sounded at ten instead of nine.

Figure 4:

In order to allow sufficient time for the action of the electric current to sound the bell or operate other mechanism, I form a step, $h$, in the cam A, so that after the lever E begins to descend and moves the drum far enough to complete the circuit it will stop for a few moments and remain in that position, by reason of the lever B resting upon the step, as shown in Fig 4, until the cam advances and allows the lever E to move the drum farther on, so as to carry the plate out of contact with the spring-points. It should be noticed in this connection that the lever is raised slowly by the cam which revolves with the clock parts, and while this movement is being made the drum is stationary, and that it moves only with the downward rapid return movement of the lever.

I have herein described the device as working with an open circuit, but it may be made to work with a closed circuit by simply extending the plate g nearly around the drum, in which case the spring-points would rest upon said plate for the major part of the time, and when the open space between the ends of the plate came under said points the circuit would be opened to sound the bell. When thus arranged a piece of rubber might be placed in the open space, if desired, and instead of insulating merely the plate g the whole frame-work which supports the drum may be insulated.

The device is chiefly designed for sounding a bell in some distant place, as a tower, at certain hours in every twenty-four. The devices or mechanism employed in the tower for ringing the bell by electricity may be those employed for that purpose ordinarily—as, for instance, in electric fire-alarms.

I claim as my invention—

1. The combination of the continuously-revolving snail-cam A, driven by the clock movement, the drum C, bearing the insulated plate g, the ratchet-wheel D, and the system of levers or equivalent mechanism intermediate between the cam and the drum, the complete organization operating substantially as described, and for the purpose specified.

2. The combination of the points to which the wires are connected, the drum C, bearing the insulated plate g, the ratchet-wheel D, weighted lever E, carrying the spring-pawl d, and mechanism operated through the time movement for slowly raising said lever, the ratchet-wheel and spring-pawl being so combined with the lever that the ratchet-wheel and drum are stationary while the lever is being gradually raised, and move only during the rapid downward movement of the lever, substantially as described, and for the purpose specified.

3. The combination of the drum C, ratchet-wheels D and F, dog b, weighted lever E, carrying spring-pawl d, and stop c, the clock-movement and mechanism operated by said clock-movement to raise said lever, while the return of said lever operates to move the wheels and drum instantly, substantially as described, and for the purpose specified.

4. The combination of the drum C, carrying insulated plate g, points e e, ratchet-wheel D, lever E, carrying spring-pawl d, lever B, and cam A, provided with the step h, substantially as described, and for the purpose specified.

SPENCER H. WOOD.

Witnesses:
JAMES SHEPARD,
JOHN EDWARDS, Jr.